(12) United States Patent
Kaidi

(10) Patent No.: US 12,284,194 B2
(45) Date of Patent: Apr. 22, 2025

(54) DETECTING MALICIOUS EMAIL ADDRESSES USING EMAIL METADATA INDICATORS

(71) Applicant: PAYPAL, INC., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 618 days.

(21) Appl. No.: 17/553,576

(22) Filed: Dec. 16, 2021

(65) Prior Publication Data

US 2023/0199002 A1 Jun. 22, 2023

(51) Int. Cl.
*H04L 9/40* (2022.01)
*H04L 51/08* (2022.01)

(52) U.S. Cl.
CPC .......... *H04L 63/1416* (2013.01); *H04L 51/08* (2013.01); *H04L 63/1425* (2013.01); *H04L 63/145* (2013.01); *H04L 63/20* (2013.01)

(58) Field of Classification Search
CPC . H04L 63/1416; H04L 51/08; H04L 63/1425; H04L 63/145; H04L 63/20
USPC .......................................................... 726/22
See application file for complete search history.

(56) References Cited

U.S. PATENT DOCUMENTS

| | | | |
|---|---|---|---|
| 11,151,568 B2* | 10/2021 | Bermudez-Cisneros | ................... H04L 63/08 |
| 2008/0114885 A1* | 5/2008 | Kulkarni | .............. H04L 67/1001 709/229 |
| 2013/0173642 A1* | 7/2013 | Oliver | ..................... G06F 40/20 707/756 |
| 2019/0222606 A1* | 7/2019 | Schweighauser | ........ G06N 5/02 |
| 2021/0090816 A1* | 3/2021 | Ibrahim | ................. G06N 20/00 |
| 2021/0141617 A1* | 5/2021 | Burman | ............. G06Q 10/0633 |

OTHER PUBLICATIONS

Grant Ho, Detecting and Characterizing Lateral Phishing at Scale, Oct. 29, 2019 (Year: 2019).*

* cited by examiner

*Primary Examiner* — Shin-Hon (Eric) Chen
*Assistant Examiner* — Saad Ahmad Abdullah
(74) *Attorney, Agent, or Firm* — Haynes and Boone, LLP

(57) ABSTRACT

There are provided systems and methods for detecting malicious email addresses using email metadata indicators. Digital accounts may be attacked by malicious computing processes or other actions that attempt to compromise the security of accounts and/or perform account takeovers. To increase security of the accounts and account data, the service provider may interface with a digital address and/or identifier provider, such as an email provider to request metadata indications of addresses. The metadata indicator may include a score associated with whether the address is compromised or being used for fraudulent purposes. This score may be based on usages of the address over a period of time, connections of the address, and other activities. The indicator may be used to determine whether to allow data changes to the account's data.

20 Claims, 6 Drawing Sheets

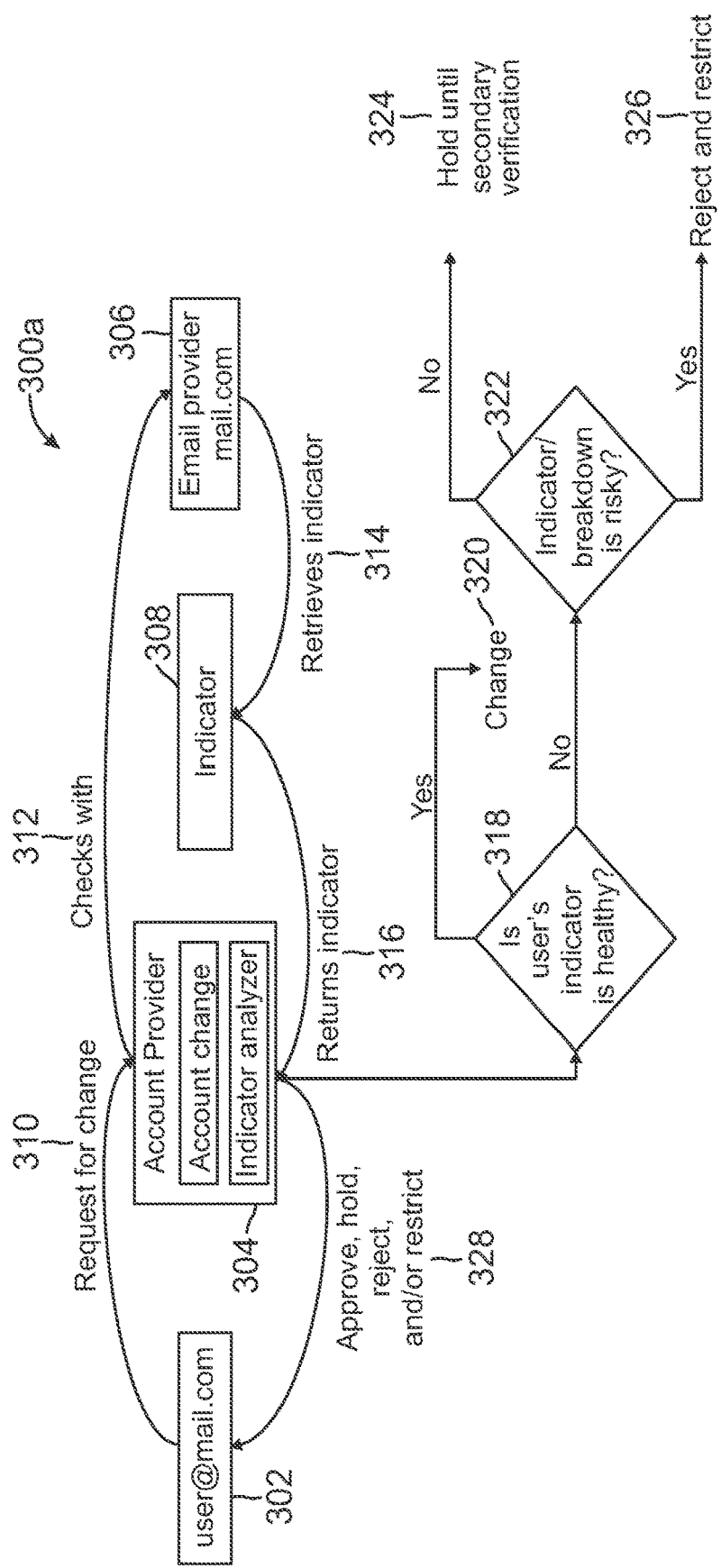

DETECTING MALICIOUS EMAIL ADDRESSES USING EMAIL METADATA INDICATORS

TECHNICAL FIELD

The present application generally relates to digital computer security and more particularly to detecting and preventing unauthorized account data changes to malicious email addresses and other contact identifiers using metadata indicators.

BACKGROUND

Online service providers may provide services to different users. When providing these services, the service providers may provide an online platform with digital accounts that may be accessible over a network. The digital accounts may be used to provide services to users, which may be linked to other accounts and/or contact identifiers used to transmit electronic communications including emails, text messages, voice calls and communication, instant messages, push notifications, and the like. Users may utilize a computing device to access and utilize the digital accounts with the service provider. However, as hackers and other malicious users or entities become more sophisticated, they may perform different computing attacks and other malicious conduct to compromise accounts and/or perform account takeovers by attempting to change a password and/or email address. Thus, is it desirable to provide more robust and sophisticated manners of providing account security and preventing account takeovers to reduce and stop breach or access of accounts by malicious and/or fraudulent entities.

BRIEF DESCRIPTION OF THE DRAWINGS

FIG. 3A is an exemplary system environment for processing metadata indicators for email addresses and other contact identifiers to determine whether such addresses or identifiers are associated with malicious activity, according to an embodiment;

FIG. 3B is a diagram of a rating system for metadata indicators for email addresses and other contact identifiers, according to an embodiment;

Figure 1:
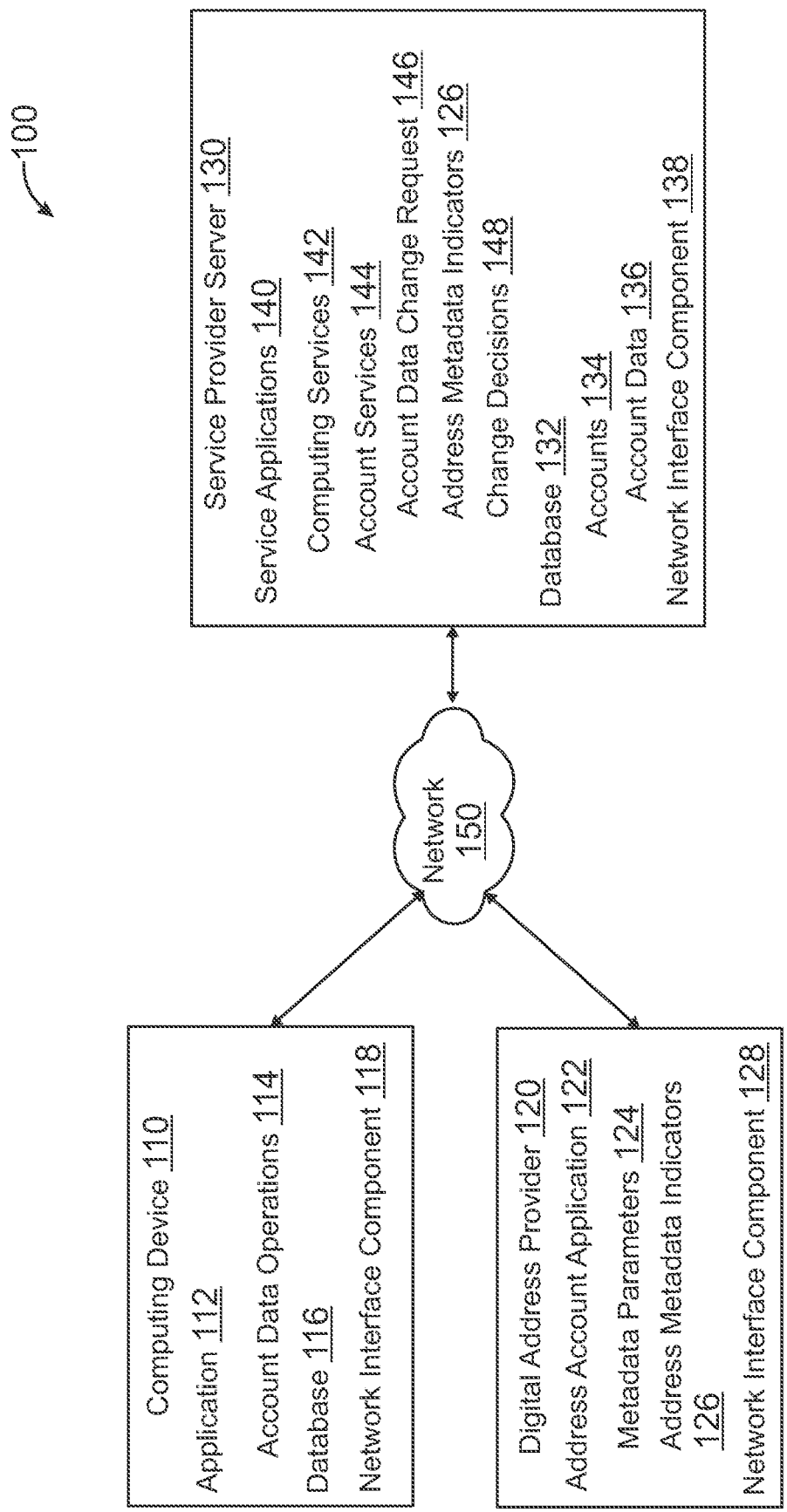
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for detecting malicious email addresses using email metadata indicators. Systems suitable for practicing methods of the present disclosure are also provided.

With online service providers, such as online platforms and systems for service providers interacting with end users' computing devices, digital accounts may be provided that may face different types of computing attacks coming from malicious users, bots or scripts, and/or other entities over a network. A bad actor may initiate a computing attack on the computing environment of the service provider, such as an eavesdropping attack, a password attack and/or account takeover, a web abuse (e.g., account enumeration, brute force attacks, SQL injection), or other type of computing attack that may compromise digital accounts and/or electronic communications, such as maliciously obtaining access or authentication information, exposing data, and/or otherwise attempting an account takeover (ATO). This computing attack and/or ATO may introduce risk to private, confidential, or sensitive data of users and/or the service provider, which may lead to fraud and loss. For example, if an account is compromised by an ATO, the malicious entity may engage in fraudulent electronic transaction processing, may compromise financial or sensitive data, and/or perform other activities that may lead to risk, fraud, and/or loss.

In order to assist in preventing or minimizing these computing attacks, ATOS, and other abuses of the service providers, the service providers, in various embodiments, may utilize a coordinated system for calculating and processing metadata indicators to execute one or more operations, which may provide enhanced security when malicious email addresses, additional digital accounts, and/or contact identifiers are detected. In this regard, a service provider may utilize an application programming interface (API) integration to exchange API calls with contact identifier providers, such as email addresses and account providers, to request and receive metadata indicators (e.g., email metadata indicators (EMIs) and other indicators based on metadata for a digital address and/or identifier used to communicate with, connect to, or message a user). These indicators may be received by the service provider and may be processed to determine whether an email address indicates fraud and/or use by a malicious entity.

Receipt of an indicator may occur in response to an attempt to change an email address or other contact identifier used by an account (e.g., for messaging, transmission of notifications including push notifications, account or password recovery, and the like) to another different email address or other contact identifier. A digital address or address, as referred to herein, may correspond to an identifier (e.g., a unique, universally unique, or globally unique identifier (UID, UUID, or GUID), including phone numbers, messenger identifiers, user identifiers, and other contact identifier) or other information that may be used to contact and/or communicate with a user. To ensure the new address is not malicious and fraudulent, which may lead to or allow an ATO, the service provider may use the indicators to provide additional data and account security without requiring manual efforts for analysis of the requested change.

For example, a service provider may provide electronic transaction processing and other computing services to entities through digital accounts, including consumers and merchants that may wish to process transactions and payments. The other computing services may include email, social networking, microblogging, media sharing, messaging, business and consumer platforms, etc. To establish an account, these different users may be required to provide account details, such as a login, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, and/or other information. The entity may also be required to provide financial or funding source information, including payment card (e.g., credit/debit card) information, bank account information, gift card information, benefits/incentives, and/or financial investments, which may be used to process transactions. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

The service provider may also request that the user set or establish a contact identifier (e.g., email address, phone number, etc., which may be validated and confirmed to be user's identifier) used to contact the user, for example, in the event of account or password recovery, detected fraud or ATO, potential security breach or data loss, and the like. The contact identifier may also be used to transmit alert and/or confirmation messages, which may alert of fraud or certain actions (e.g., large transaction processing requests and/or transfer of funds) and verify that the action is valid. The contact identifier may also be used for additional services, such as messaging the user with new features and offers, notifying the users of changes including terms of service, providing advertisements and/or incentives, and/or otherwise engaging a user and providing information. However, malicious users, entities, and/or other computing devices (e.g., computing devices that may include malware, viruses, and the like that may be hijacked to automate computing attacks) may attempt to abuse and/or compromise the service providers systems in order to perform an ATO, compromise sensitive data, such as PII and/or funding source data, and the like. One potential avenue of attack is to gain access to an account through an ATO or other malicious attack and switch the established and/or verified contact identifier to one owned or controlled by the malicious entity. This allows the malicious party to divert potential alerts to the user, as well as confirm risky transactions and/or transfers that are fraudulent and performed by the malicious entity.

To provide increased security and data protection, without further burdening the user and/or security teams of the service provider with manual efforts, the service provider may provide a computing platform and system that analyzes metadata indicators for digital addresses and identifiers to determine whether those addresses have indication of fraud, setup or generation for malicious or fraudulent purposes, and the like. In this regard, the service provider may first establish one or more API integrations with APIs and computing systems and services of address and/or identifier providers, such as email account providers, cellular telephone networks and/or providers, messaging platforms, and the like. This may be done by providing a set of standards, solutions, and/or guidelines that allow for integration and exchange of API calls, requests, and responses via one or more APIs of the service provider and one or more APIs of each address provider. By establishing the APIs and integrations, data may be exchanged between the service provider with other providers used by users of the service provider including queries and/or requests for metadata indicators and responses having a score, value, or indicator.

Once the account of a user is established with the service provider, the user may utilize the account via one or more computing devices, such as a personal computer, tablet computer, mobile smart phone, or the like. The user may engage in one or more online or virtual interactions that may be associated with electronic transaction processing, images, music, media content and/or streaming, video games, documents, social networking, media data sharing, microblogging, and the like. The user may utilize a computing device to access the account. During onboarding and/or after when accessing the account and configuring settings, the user may opt-in to the service provider requesting and receiving metadata indicators when needed for checking a change of address or identifier for the account or otherwise performing a validity and risk check of an address for the user. The opt-in may allow the service provider to ping, query, or request the corresponding address provider for the address in question on behalf of the user, and receive a metadata indicator or other score/value associated with the metadata indicator. The service provider may therefore use the address of the user to query a corresponding provider for a metadata indicator or the like.

Thereafter, the service provider's computing and/or data security systems may detect a change of an address established for the user's account to a new address. The service provider may determine that the change requires receiving and/or analyzing a metadata indicator to determine if the change is valid or fraudulent for purposes of malicious or fraudulent activity. The service provider may always perform a check when this type of change is requested or may perform randomized sampling and/or selection for checks. However, the service provider may also perform the check in response to risk assessment, a number of days or other time since a last login, a current time of the change and a known time for the user of the account (e.g., if the change is occurring in the middle of the night when the account is normal inactive), or another parameter.

The service provider may then request one or more metadata indicators for the different addresses associated with the change of address for the account. The service provider may perform a metadata indicator check and analysis of the new address that is to be changed and used with the user's digital account, and thus, query the provider of the new address. In further embodiments, the service provider may request multiple metadata indicators and may further check and analyze the previous address used with the account (e.g., the one currently being used, and which is to be switched out for the account). In some embodiments, additional metadata indicators for further addresses may also be requested. In this regard, if both the old and new addresses are provided by the same domain and/or provider, the service provider may query the same domain and/or provider via an API integration and calls to that provider. However, if multiple providers are used for the old and new addresses, multiple API integrations, calls, and queries may be used based on the established APIs configured using the solutions and guidelines provided by the service provider to the address providers.

The address provider may then generate, calculate, and/or determine one or more metadata indicators. For example, for the new digital address and/or contact identifier to be used with the user's account with the service provider, the service provider may receive an API response having the metadata indicator calculated using one or more metadata parameters and attributes for the address. With an email address and account, an email provider may provide an EMI associated with access to and/or use of the account. An EMI may include a score, value, or other analytic (e.g., a risk score matrix or the like) for the email address based on a number of days from or since a last login, a number of days from or since a last trusted login, a Boolean associated with whether there are any new and/or untrusted connections with the email address, and the like.

Other metadata parameters and attributes may include a degree of impossible travel (e.g., the two distances are too great to be traveled using standard travel means) or distance between a known or established location for the email address (e.g., a home location or location/IP address normally associated with login or use of the email address account) and a location of a last login or use of the email address account, anomalous concurrent sessions (e.g., multiple logins including logins at the same time where one or more are from unknown devices and/or locations/IP addresses), whether the time since last login is inactivity (no attempted logins) or inaccessibility (logins that were unsuccessful and therefore the account may be compromised), suspicious and/or unusual activity or actions using the account, and/or time patterns of logins. Metadata for accounts may also include valid and/or invalid IP addresses, MAC addresses, geo-locations, and/or other device data, as well as main and associated email addresses, account identifiers, and the like.

The address may provide a weighted algorithm to calculate and determine a metadata indicator as a score or other analytic(s) of the potential fraudulent or malicious establishment and/or use of the address. Thus, the metadata indicator may be balanced and/or weighted between the aforementioned metadata parameters and/or attributes. Further, the metadata indicator may be configured to hide certain data, attributes, and/or identifying of sensitive information from other entities including the service provider. This hidden data may include sensitive, private, or confidential information to the user or other entity, such as personally identifiable information (PII). In other embodiments, other data that is secure may be hidden, including usernames or other authentication information, account information, financial information, and the like. This may be hidden by obfuscating in the metadata indicator and/or providing a score that does not include such information even if used to calculate the score. Thus, the address may provide a breakdown that does not reveal PII and the like. The hidden information may also correspond to and/or be selected based on privacy laws, regulations, and/or guidelines for the region and/or address provider.

In various embodiments, the metadata indicator may be calculated as a single score, value, or other indicator of risk that the new address is compromised, malicious, or created/utilized for fraud. In some embodiments, address providers may agree to map their metadata indicators to a risk matrix, which may be used to provide a score or indicator of the address. This risk matrix may also be based on a standard and/or based on API guidelines, solutions, and/or requirements for configuring APIs to be compatible and share data with the service provider for metadata indicators. The metadata indicators' scores or values may also be unique configured by each address provider with the service provider so that the service provider is properly capable of processing and utilizing the indicator when received, such as in one or more rules-based on machine learning (ML) model-based engines and systems for decision-making and risk analysis. In further embodiments, the metadata indicator may include a breakdown based on different metadata parameters and/or attributes, which may include different scores or indicators for different portions of the metadata that indicates risk or validity, which may assist in taking appropriate action and/or security operations. However, the breakdown may be configured to further hide PII and other sensitive data.

Thereafter, the metadata indicator for the new address (as well as the old address and/or any auxiliary or associated addresses) may be returned to the service provider for processing. The service provider may directly utilize the metadata indicator to take an action or may further utilize the metadata indicator in a risk and/or fraud analysis and prevention engine and system (e.g., based on rules and/or ML models). The service provider may determine if the address indicates the address is malicious, compromised, or fraudulent, as well as whether the change from the old address to the new address would risk an ATO, fraudulent activity, and/or loss. Where multiple metadata indicators are used, both may be processed and/or used, may be analyzed separately, and/or a balancing may be performed for the risk assessment of the change between the two addresses. If the metadata indicator appears healthy or safe, the change may be allowed. This may initiate a notification or alert of the change to the old address, while the new address may receive an additional notification, as well as a link, process, interface element, or the like that may be interacted with to confirm the address change.

Where associated metadata indicators are used for additional addresses, such as ones for recent contacts, additional email addresses in the same domain, and the like, further weighting and balancing may be applied to the different metadata indicators to determine potential risk and fraud in performing the change from the old address to the new address. For example, new contacts and their corresponding addresses may be analyzed as a mesh network, where a relationship score between different addresses based on domain, length of connection between the addresses, number of communications exchanged, and the like may be used to determine one or more metadata indicators and an overall risk score in the address.

If the risk or fraud score for the metadata indicator(s) and/or resulting risk analysis of the addresses and the corresponding change between the old and new addresses is too high, such as if it meets or exceeds a threshold score, then the service provider may execute one or more security operations to confirm and/or prevent the change in order to reduce potential fraud. For example, if the metadata indicator is unhealthy and is too risky (e.g., over a second threshold such that the address appears to be entirely fraudulently or maliciously created and/or used), the change from the old address to the new address may be refused. Further, the user may be notified and alerted at the old address, as well as any additional contacts and/or information available for the user (e.g., a phone number via a call or text, a social networking or microblogging message, etc.). Further, the service provider may lock or place restrictions on the account with the service provider to prevent further abuse and/or loss.

However, if the metadata indicator is not healthy but is not designated as too risky (e.g., at or above a risk threshold to indicate the metadata indicator isn't healthy and valid but below or at another threshold that indicates a high degree or probability of being fraudulent or malicious), other operations may be performed. For example, secondary verification may be required to effectuate the change. The secondary verification may correspond to a further approval and/or confirmation of the change, which include multifactor authentication codes or passwords and/or security challenges (e.g., based on known information, question answers, CAPTCHA, and/or personal information). The verification using multifactor authentication and/or security challenges may be required during the request to change the addresses, such as in a user interface utilized to perform the change. If passed, the change may be effectuated to the new address and/or the new address may be added to a whitelist; however, if not, the change may be refused and/or the new address blacklisted or reviewed for potential fraud. The additional verification may also time out if not responded to in a certain amount of time, whereby the change would be refused, canceled, or prevented. Restrictions may also be placed on the account while awaiting the secondary verification and/or if the secondary verification fails. In other embodiments, additional thresholds may be utilized (i.e., not just one or two thresholds), where actions are based on which thresholds are met and/or details of the account. For example, if the metadata indicator indicates a lower, non-zero possibility of fraud, but the account is a high-dollar/high-volume account, additional security measures may be taken.

Other confirmations may be requested via another communication channel and message. For example, the user may be notified at the old address with a verification and/or confirmation request of the change. If the user retains access to the old address, the user may verify and confirm the change by receiving a message at a corresponding account and responding. This may also be sent to a known and trusted address for the account, such as a phone number when an email address is being changed. However, the additional verification and confirmation may not be sent to the new address to prevent a potentially fraudulent or malicious entity from responding and confirming at a compromised address. Thus, service providers offering account services may provide increased account and data digital security without requiring manual efforts and inputs. The service provider and address provider systems may integrate to provide a coordinated system that allows for faster and predictive identification and prevention of ATOs for digital accounts. This reduces the need to human intervention to identify and detect malicious accounts and their corresponding digital addresses.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a computing device 110, a digital address provider 120, and a service provider server 130 in communication over a network 150. Computing device 110 may be utilized by a user to receive communications over network 150, where service provider server 130 may provide various data, operations, and other functions over network 150 to utilize digital accounts provided by service provider server 130. In this regard, computing device 110 may request a change of a digital communication address, identifier, or the like for an account with service provider server 130, which may include initial establishing of the address with the account and/or changing from a previous address to a new address. Service provider server 130 may request a metadata indicator of the address (e.g., an address metadata indicator or EMI for email addresses) from digital address provider. Using the metadata indicator, service provider server 130 may determine whether the address indicates fraud or a compromised address/account that requires computing security and data protection measures to be implemented.

Computing device 110, digital address provider 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Computing device 110 may be implemented as a communication device that may utilize appropriate hardware and software configured for wired and/or wireless communication with digital address provider 120, service provider server 130, and/or another device or service. For example, in one embodiment, computing device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Computing device 110 of FIG. 1 contains an application 112, a database 116, and a network interface component 118. Application 112 may correspond to executable processes, procedures, and/or applications with associated hardware. In other embodiments, computing device 110 may include additional or different modules having specialized hardware and/or software as required.

Application 112 may correspond to one or more processes to execute software modules and associated components of computing device 110 to provide features, services, and other operations for a user over network 150, which may include receiving and displaying messages and electronic communications from service provider server 130. In this regard, application 112 may correspond to specialized software utilized by a user of computing device 110 that may be used to access a website or UI that may display one or more electronic communications. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information (e.g., a website for an email provider or other messaging service), presenting the website information to the user, and/or communicating information to the website. However, in other embodiments, application 112 may include a dedicated application of service provider server 130 or other entity (e.g., an email provider or messaging service).

Application 112 may be associated with account information, user financial information, and/or transaction histories for one or more digital accounts of one or more users with service provider server 130, which may be accessed, utilized, and changed using account data operations 114. Account data operations 114 may include operations to access an account, such as through authentication by valid users, and utilize computing services provided by service provider server 130 using the account. However, where computing device is utilized by a bad actor or malicious entity, account data operations 114 may be used to perform an ATO and/or request a fraudulent change of digital address for the account so that fraud, ATO, and/or other computing attacks and conducted may be performed by the bad actor. In this regard, account data operations 114 may be used to validly or fraudulently request a change of data for an account, such as adding a digital address and/or changing a previous digital address to a new digital address. Such requests and provided addresses, identifiers, and/or other information provided using account data operations 114 may be processed to identify malicious or fraudulent requests and/or addresses.

Application 112 may be used to process a transaction generated by and/or for application 112 using a merchant website and/or when engaging in transaction processing at a physical merchant location. For example, a transaction may be generated, initiated, and/or detected by service provider server 130 and/or another online transaction processor for processing. In response to transaction processing, application 112 may be used to view receipts and/or transactions histories, as well as access account information via account data operations 114. However, in further embodiments, different services may be provided via application 112, including social networking, media posting or sharing, microblogging, data browsing and searching, online shopping, and other services available through service provider server 130 using one or more digital accounts provided by service provider server 130. Thus, application 112 may also correspond to different service applications and the like.

In various embodiments, computing device 110 also includes other applications as may be desired in particular embodiments to provide features to computing device 110. For example, other applications may include security applications for implementing client-side security features, programmatic client applications for interfacing with appropriate application programming interfaces (APIs) over network 150, or other types of applications. The other applications may also include additional communication applications, such as email, texting, voice, social networking, and IM applications that allow a user to send and receive emails, calls, texts, and other notifications through network 150. The other applications may be utilized with application 112 to utilize an account and/or service. The other applications may include device interfaces and other display modules that may receive input and/or output information. For example, the other applications may contain software programs, executable by a processor, including a graphical user interface (GUI) configured to provide an interface to the user.

Computing device 110 may further include a database 116 stored on a transitory and/or non-transitory memory of computing device 110, which may store various applications and data and be utilized during execution of various modules of computing device 110. Database 116 may include, for example, identifiers such as operating system registry entries, cookies associated with application 112 and/or other applications, identifiers associated with hardware of computing device 110, or other appropriate identifiers, such as identifiers used for payment/user/device authentication or identification, which may be communicated as identifying the user/computing device 110 to service provider server 130. Moreover, database 116 may store data provided to service provider server 130 during account usage and/or change of account data, including a device fingerprint, a geo-location, one or more used IP addresses, account login histories or data, and the like.

Computing device 110 includes at least one network interface component 118 adapted to communicate with digital address provider 120, service provider server 130, and/or another device or service. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Digital address provider 120 may be maintained, for example, by a communication, messaging, and/or account service provider, which may provide operations for transmissions of voice calls and data, electronic communications (e.g., emails, text or instant messages, push notifications, social or microblogging posts and/or messages, etc.), and the like, which may be used to communicate with and/or notify users. In this regard, digital address provider 120 includes one or more processing applications which may be configured to interact with computing device 110 to send and receive electronic communication to computing device 110. Further, digital address provider 120 includes one or more processing applications, APIs, API integrations, and the like to exchange data (e.g., via API requests, responses, and other calls) to facilitate generating, calculating, and providing metadata indicators for digital addresses and accounts. In certain example, digital address provider 120 may be provided by an email provider, a cellular network and communications provider, a messaging service, and the like. However, digital address provider 120 may be maintained by or include another type of service provider that facilitates communications between parties.

Digital address provider 120 of FIG. 1 includes an address account application 122 and a network interface component 128. Address account application 122 may correspond to executable processes, procedures, and/or applications with associated hardware. In other embodiments, digital address provider 120 may include additional or different modules having specialized hardware and/or software as required.

Address account application 122 may correspond to one or more processes to execute modules and associated specialized hardware of digital address provider 120 to provide accounts, addresses, and/or identifiers for digital electronic communications, such as emails, telephone voice calls and networks, text messages, network messages and communications, push notifications, and the like. In this regard, address account application 122 may correspond to specialized hardware and/or software used by digital address provider 120 to provide services for sending and receiving electronic communications using an account accessible by computing device 110. Address account application 122 may be used by a user associated with computing device 110 to perform one or more messaging or communication services. Address account application 122 may correspond to PSTN, cellular, and other telephonic communication services, SMS and MMS messaging, messaging applications and messaging services, social networking, media posting or sharing, microblogging, data browsing and searching, and other services available through digital address provider 120. Address account application 122 may be used by a user to establish an account, which may be used to generate and provide user data for the user, as well as access, send, receive, and/or view communications associated with an account accessible using address account application 122.

In various embodiments, address account application 122 may establish an API and integration with service provider server 130 for purposes of exchanging data. For example, a developer, administrator, or other user of digital address provider 120 may access and/or utilize a set of API guidelines, standards, requirements, and/or solutions for configuring one or more APIs to interface with service provider server 130 via one or more APIs of service provider server 130. This may provide an API integration that allows exchange of calls when performing metadata indicator calculation and sharing. Thereafter, address account application 122 may exchange API calls in order to receive requests and queries for metadata indicators, including EMIs where address account application 122 provides email accounts and services, and response to service provider server 130 with one or more metadata indicators.

In response to receiving a request or query from service provider server 130 via an API request or call, address account application 122 may access and/or determine metadata parameters 124. Metadata parameters 124 may correspond to a set of parameters for different addresses provided by address account application 122. In some embodiments, metadata parameters 124 may include an amount of time since a last login associated with the address, an amount of time since a trusted last login associated with the address, or a Boolean data type associated with new connections by the address with one or more other digital addresses. In further embodiments, other ones of metadata parameters 124 may be associated with an output classification or score from a risk analysis engine, which may be rules-based or ML model-based. Metadata parameters 124 may include a distance or travel impossibility between login locations and/or with a known trusted location, anomalous concurrent sessions by different devices and/or unknown devices, inactivity versus inaccessibility where multiple logins have been failed (e.g., a brute force or credential stuffing attack indication), suspicious and/or unusual activity, and/or time patterns of logins versus known or standard login times for the account.

For example, if the address and account has had one day since a last login but twenty days since a last trusted login (e.g., using a trusted device, location, or the like), this may be indicative of fraud and/or ATO. The address and account may also have many recent logins but no trusted logins where a user has verified their identity, which may indicate the account was established for purposes of fraud. Conversely, if the address and account recently (e.g., last hour, day, etc.) has a trusted login, which also coincided with the last login, this may indicate little likelihood of fraud and/or ATO, resulting in a health metadata indicator. Further, if the address and account have numerous new connects, at least a portion of which are unknown, untrusted, and/or indicate fraud, this may be indicative of fraud and/or ATO, whereas no new connections or only new connections to trusted accounts and addresses and/or those socially linked to the account may indicate healthy behavior and low likelihood of fraud. Other inferences and calculations may be made based upon the scoring system of digital address provider 120 and/or service provider server 130 when using metadata parameters 124 with address metadata indicators 126.

Address account application 122 may calculate address metadata indicators 126 using metadata parameters 124 as a score, value, or other indication of whether an address and/or account is fraudulent, compromised, and/or created for/engaging in malicious behavior. In this regard, different weights and/or values may be applied to metadata parameters 124 and a resulting score may be calculated. This may be done based upon an agreed upon scoring system between digital address provider 120 and service provider server 130 and/or an internal scoring system for addresses of digital address provider 120. In order to unify and standardize address metadata indicators 126, scores for address metadata indicators 126 may be mapped to a risk score matrix and/or other risk metrics, which may allow for comparison between risk scores for address metadata indicators between different address and/or account providers. Further, a single score or a breakdown of score parameters and/or ones of metadata parameters 124 affecting the score for address metadata indicators 126 may be determined. This may also include hiding PII or other sensitive or identifying information in address metadata indicators 126 to prevent revealing information to service provider server 130 and/or third parties, as well as comply with privacy laws, regulations, standards, and/or guidelines. Address metadata indicators 126 may then be returned to service provider server 130 for processing, for example, through an API response via the API integration.

In various embodiments, digital address provider 120 includes at least one network interface component 128 adapted to communicate computing device 110, service provider server 130, and/or another device or server over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Service provider server 130 may be maintained, for example, by an online service provider, which may provide computing services to users, including account services that may allow users to establish and change account data. In this regard, service provider server 130 includes one or more processing applications which may be configured to interact with computing device 110 to analyze establishment and changes of digital addresses and identifiers to protect against ATO, fraud, and abuse by bad actors and other malicious entities. In one example, service provider server 130 may be provided by PAYPAL®, Inc. of San Jose, CA, USA. However, in other embodiments, service provider server 130 may be maintained by or include another type of service provider.

Service provider server 130 of FIG. 1 includes service applications 140, a database 132, and a network interface component 138. Service applications 140 may correspond to executable processes, procedures, and/or applications with associated hardware. In other embodiments, service provider server 130 may include additional or different modules having specialized hardware and/or software as required.

Service applications 140 may correspond to one or more processes to execute modules and associated specialized hardware of service provider server 130 to process a transaction or provide another service to customers, merchants, and/or other end users and entities of service provider server 130. In this regard, service applications 140 may correspond to specialized hardware and/or software used by service provider server 130 to providing computing services 142 to users, which may include electronic transaction processing and/or other computing services using accounts established through account services 144. In some embodiments, service applications 140 may be used by a user associated with computing device 110 to establish a user and/or payment account using account services 144, as well as a digital wallet, which may be used to process transactions. In various embodiments, financial information may be stored with the account, such as account/card numbers and information that may enable payments, transfers, withdrawals, and/or deposits of funds. A digital token for the account/wallet may be used to send and process payments, for example, through an interface provided by service provider server 130. The payment account may be accessed and/or used through a web browser application and/or dedicated payment application executed by computing device 110 and engage in computing services provided by service applications 140. Computing services 142 of service applications 140 may also or instead correspond to messaging, social networking, media posting or sharing, microblogging, data browsing and searching, online shopping, and other services available through service provider server 130.

When using account services 144, an account may be established and/or maintained by computing device 110. This may include establishing and/or changing account data, such as providing account data during an account onboarding and/or creation, as well as later maintaining that account data with service provider server 130. In this regard, an address for an account may be requested to be changed using account data change request 146, such as by changing a previously used address or identifier for another account or the like that may be used to receive communications to a new address or identifier to be used with the account to receive further communications. In response to receiving account data change request 146, an analysis of the change may be executed, which may be automatically performed for all change requests and/or executed in response to a risk analysis of account data change request 146.

Using an API integration with digital address provider 120, an API request may be transmitted to digital address provider 120, which may correspond to a request or query for one or more of address metadata indicators 126 from digital address provider 120. Digital address provider 120 may calculate and determine address metadata indicators 126 and provide an API response having one or more address metadata indicators 126. Service provider server 130 may use a score or other risk analytic to determine change decisions 148 for account data change request 146, or may utilize address metadata indicators 126 in a risk analysis engine for account data change request 146. Change decisions 148 may correspond to whether account data change request 146 for a change from one address to another is approved, requires further verification and/or confirmation, and/or is declined. Additional security operations may be executed with change decisions 148 as well, such as limiting account access and/or functionality, limit data and/or computing service availability, and/or alert the user or another user/administrator of account data change request 146 and/or a potentially fraudulent or compromised address or account. The components, operations, and communications to request and/or query for address metadata indicators 126 from digital address provider 120 and/or other address providers, as well as process address metadata indicators 126 are discussed in more detail with regard to FIGS. 2-4 herein.

Additionally, service provider server 130 includes database 132. Database 132 may store various identifiers associated with computing device 110. Database 132 may also store account data 136 for accounts 134, including payment instruments and authentication credentials, as well as transaction processing histories and data for processed transactions. Database 132 may store financial information or other data generated and stored for accounts 134 of users for use with service applications 140. With other computing services, other types of account data 136 may be stored by database 132 for accounts 134. Account data 136 for accounts 134 may also include account data for personal information, digital addresses used to communicate with account holders or controlling users, financial or digital wallet information, account histories and/or usages, and the like. As such, account data 136 may be requested to be changed using account data change request 146 that is analyzed using address metadata indicators 126.

In various embodiments, service provider server 130 includes at least one network interface component 138 adapted to communicate computing device 110, digital address provider 120, and/or another device or server over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
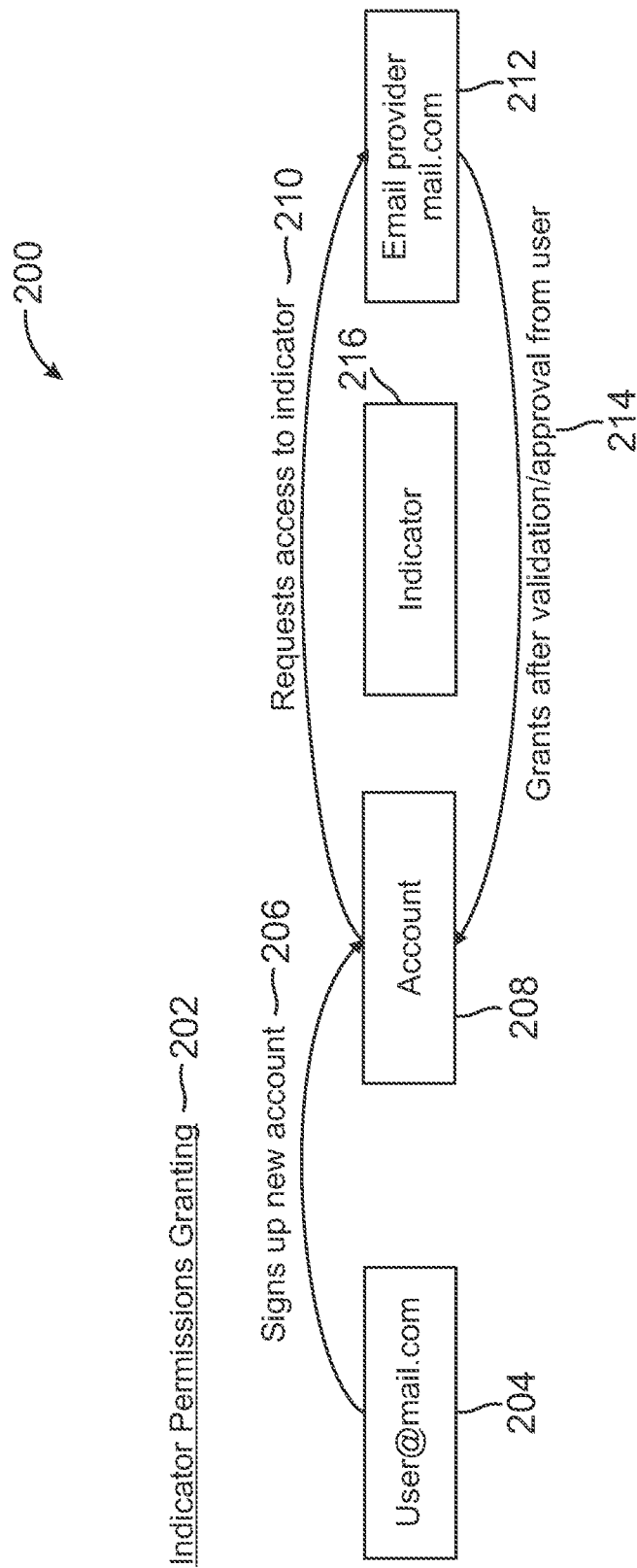
FIG. 2 is an exemplary system environment for granting permission to use indicators based on metadata for email addresses and other contact identifiers verification, according to an embodiment.

FIG. 2 is an exemplary system environment 200 for granting permission to use indicators based on metadata for email addresses and other contact identifiers, according to an embodiment. System environment 200 includes components for performing an EMI permission granting 202 that may be performed when authorized by computing device 110 between digital address provider 120 and service provider server 130, discussed in reference to system 100 of FIG. 1. In this regard, a user address 204 may be utilized with computing device 110 to perform an account signup 206, which may be used to onboard user address 204 for an account and opt-in to using metadata indicators (e.g., EMIs) for identifying and/or determining malicious addresses that may be used during account data change.

In system environment 200, initially user address 204 may be used to sign up and onboard for an account 208 during account signup 206 with a service provider, such as service provider server 130, which may correspond to an online transaction processor (e.g., PAYPAL®, VENMO®, or the like). In other embodiments, a username or identifier may be all that is required to sign up and onboard for a service provider, where user address 204 may be provided during signup or at a later time. In response to account signup 206 and/or providing user address 204 for account 208, the service provider establishing and/or maintaining account 208 may request an opt-in or other approval to obtain metadata indicators for user address 204 and/or other user addresses that may be provided for use with account 208. This opt-in may be a security preference that further secures account 208 from ATOs and other account fraud or attacks.

The service provider may then transmit an access request 210 to an email provider 212 for user address 204. Email provider 212 may also correspond to other types of address or identifier providers, including cellular provider for telephone numbers, messenger services and applications, social networking and/or microblogging platforms, and the like. Access request 210 may be transmitted through an established API integration where email provider 212 implements API solutions provided by the service provider for use with API generation and implementation between the service provider and email provider 212. Thus, an API call may be performed with email provider 212 in order to request access to one or more EMIs or other metadata indicators when addresses are used with account 208.

In response to access request 210, email provider 212 may enable and allow for exchange of EMIs and other metadata indicators for account 208 with email provider 212. This may include user address 204 so that an EMI may be retrieved for user address 204. Further, since account 208 in opted-in for EMI exchange and use, if an address is changed with account 208 (e.g., from user address 204 to another address), the other address's EMI or other metadata indicator may be retrieved for risk analysis. After validation and approval by the user with email provider 214 (e.g., after further opting in at email provider 212 with user address 204), the opt-in request is processed and completed with the service provider for account 208. Thereafter, account 208 include security permissions that allow for exchange and use of EMIs and other metadata indicators during account use and/or data change of addresses for account 208.

FIG. 3A is an exemplary system environment 300a for processing metadata indicators for email addresses and other contact identifiers to determine whether such addresses or identifiers are associated with malicious activity, according to an embodiment. System environment 300a includes components performing a password reset and/or email address change that may be performed by computing device 110 with service provider server 130, discussed in reference to system 100 of FIG. 1. In this regard, the password reset and/or email address change may be requested for a user address 302 associated with an account provided by account provider 304, which may be used to change a previous address used for an account to user address 302 and/or reset a password using user address 302 as the contact address, such as if a user does not recall their password for the account and/or no longer has access to the previous address. However, this may also be a malicious ATO, where user address 302 and/or the new password is utilized for the ATO.

In this regard, user address 302 may be requested to be used as a login, account identifier, and/or username where communications for the account are sent. A request 310 for a reset of a password and/or change of address for a corresponding digital account is performed with account provider 304, such as a service provider and/or transaction processor. Account provider 304 may include operations for an account change and an indicator analyzer, for example, to analyze a metadata indicator or EMI for potential fraud in an address and/or corresponding account and/or whether the address/account is compromised. In this regard, account provider, responsive to request 310, may perform a check 312 with email provider 306 for an EMI, such as indicator 308 for user address 302. In some embodiments, request 310 may also include a request for an EMI or other metadata indicator for the previously used address (e.g., the current address for the account that is being removed or changed to user address 302). Email provider 306 my calculate and determine indicator 308 at a time of check 312 or may previously generate indicators for different addresses and accounts (e.g., at a certain periodic time, such as hourly, daily, etc.).

Indicator 308 may be based on one or more metadata parameters or attributes for user address 302. For example, metadata may include a last login time and/or timestamp, a last trusted login time and/or timestamp, a Boolean (e.g., true/false or other binary) identifying new connections or new untrusted connections, a distance between sequential login locations and/or between a last login and a home or other permanent location, concurrent sessions by different devices and/or unknown devices, a number of failed logins, suspicious and/or unusual activity, and/or time of last logins and usual login times. Indicator 308 may be generated as one or more risk scores or analytics, which may be provided as a processable score to the service provider. For example, indicator 308 may be mapped to a risk score matrix shown in diagram 300b of FIG. 3B FIG. 3B is a diagram 300b of a rating system for metadata indicators for email addresses and other contact identifiers, according to an embodiment. Diagram 300b includes a risk score matrix that may be used by address provider 120 with service provider server 130, discussed in reference to system 100 of FIG. 1.

For example, the risk score matrix may be used to standardize and/or make compatible different metadata indicators for potential of fraudulent or compromised accounts and/or addresses. In this regard, a score 330 may be calculated from 0-9, although other ranges and/or values may be used (e.g., A-E, 1-10, 1-100, etc.). A risk designator 332 may further be used to designate a corresponding risk that an account, based on the account's metadata and the process to calculate an EMI or other metadata indictor, is compromised or may otherwise be fraudulent. Score 330 and risk designator 332 may allow for standardizing of metadata indicators, which may allow service providers to corresponding configure risk analysis systems for detection of malicious emails and other addresses with multiple address providers.

Returning to FIG. 3A, a retrieval 314 of indicator 308 is performed by email provider 306, and indicator 308 is provided during a return 316 to account provider 304. Account provider 304 may then perform additional operations to determine whether to allow the change of addresses to user address 302 and/or provide a password reset from request 310. For example, a health check 318 is performed on indicator 308, If indicator 308 is healthy, a change allowance 320 is processed and user address 302 may be allowed as the new address for the account and/or a password reset may be performed. However, if indicator 308 is not healthy, a breakdown 322 is performed of indicator 308. Breakdown 322 may be used to analyze an overall risk of user address 302 based on indicator 308 to determine whether fraud is likely and thus, request 310 should be refused, or if indicator 308 may pose potential risk but verification and/or confirmation of request 310 may overcome that risk and allow processing of request 310.

In this regard, if breakdown 322 does not indicate that indicator 308 is too risky, secondary verification 324 may be requested. Secondary verification 324 may correspond to an email, message, or notification transmitted to the user or owner of the account. This may be transmitted to the previous email address or other account that is verified for the account in order to confirm the user has access to that address/account and can verify request 310. However, secondary verification 324 may not be sent to user address 302 with a link, interface element, or operation to confirm request 310 in the event that user address 302 is actually compromised or fraudulently controlled so that the fraudster or other bad actor cannot confirm their own request to change addresses and/or passwords. Other verifications may also be used, such as secrets or security questions, multi-factor authentication, and the like.

If breakdown 322 indicates that indicator 308 is too risky, a rejection 326 may be performed by account provider 304 and request 310 may be rejected. Thus, user address 302 may not be changed to the address for communications transmitted for the account and/or a password reset may not be initiated. In some embodiments, user address 302 may also be added to a blacklist or the like to prevent further fraud. Thereafter, an account data change operation 328 is performed. Account data change operation 328 may include security operations to protect the account from abuse and therefore may include approving the address change and/or password reset in response to change allowance 320. However, where breakdown 322 is required, account data change operation 328 may include holding the address change and/or password reset until secondary verification 324 is received. However, where rejection 326 is performed, account data change operation 328 may prevent any data change or other administrative actions. Holding and/or rejecting during account data change operation 328 may also include restricting account usage and/or data access, such as by limiting usage of certain computing services and/or resources using the account (e.g., limiting availability of funds or payment instruments, only allowing a certain cap or maximum or transaction processing, etc.).

Figure 3C:
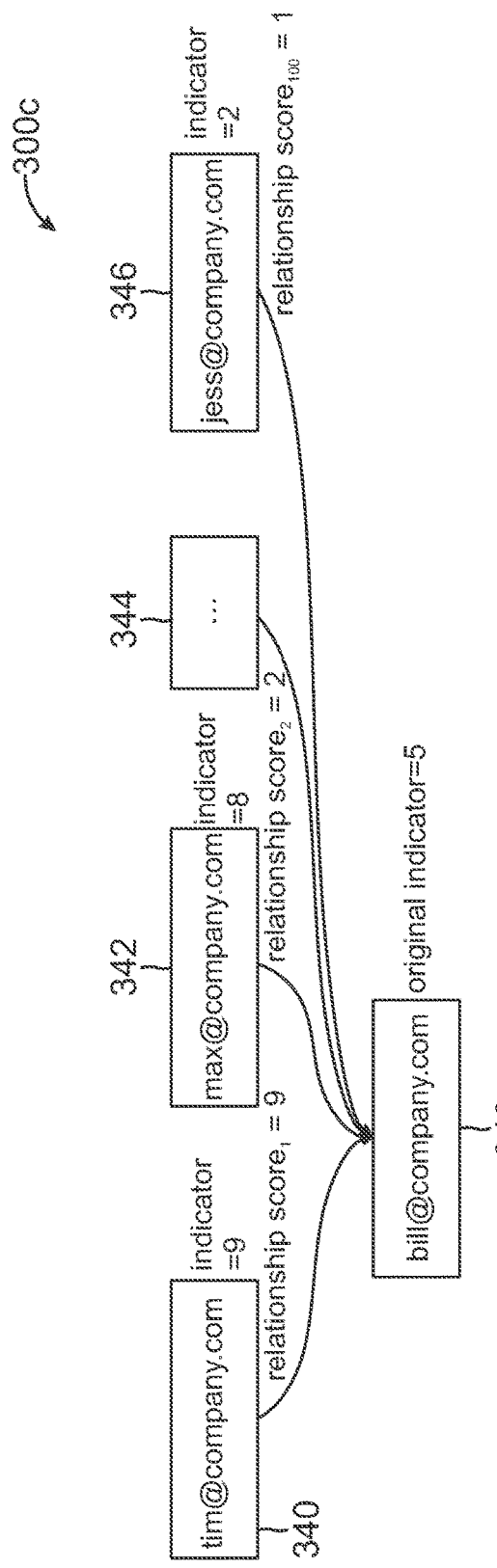
FIGS. 3C and 3D are exemplary system environments for additional processing of multiple metadata indicators for email addresses and other contact identifiers, according to an embodiment.
Figure 3D:
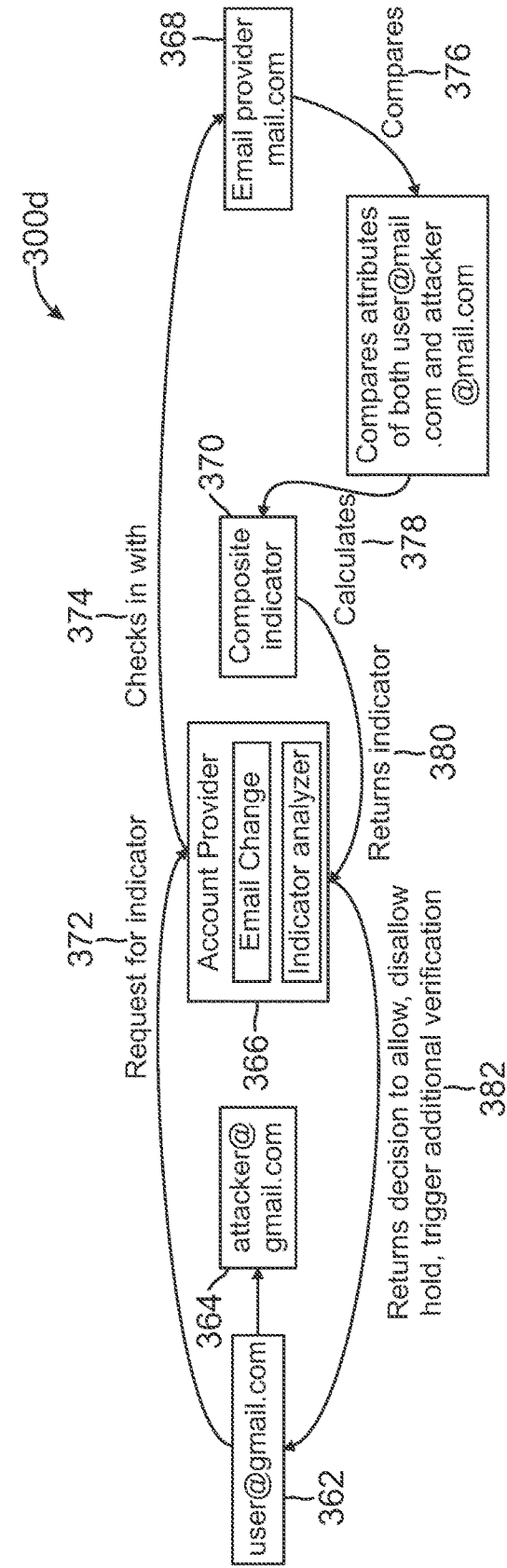

FIGS. 3C and 3D are exemplary system environments 300c and 300d for additional processing of multiple metadata indicators for email addresses and other contact identifiers, according to an embodiment. System environments 300c and 300d include components performing additional metadata indicator analysis operations by service provider server 130 when receiving metadata indicators from address provider 120, both discussed in reference to system 100 of FIG. 1. In this regard, system environment 300c demonstrates a mesh network of addresses that have relationship scores when determining a strength score of addresses that may be related. This may correspond to utilizing more than one metadata indicator for a risk analysis of an address. Similarly, system environment 300d demonstrates a usage of metadata indicators for both an old and a new address during an address change for an account.

In system environment 300c, a first user address 340, a second user address 342, additional user address 344, and a third user address 346 may each be additional addresses affiliated with a main user address 348 for which a metadata indicator is being calculated and/or processed for a risk assessment. The user addresses in system environment 300c may be related based on having the same domain, such as working at the same "company" that provides a domain and addresses for employees of the company. Each of the addresses are shown with a corresponding indicator, as well as each of first user address 340, second user address 342, additional user address 344, and third user address 346 having a relationship score to main user address 348. The original indicator of main user address 348 being compromised or malicious is 5, which, in the risk score matrix of diagram 300b in FIG. 3B would indicate "warning".

However, first user address 340 has a metadata indicator of 9 and second user address 342 has a metadata indicator of 8. Thus, relationship of those addresses to main user address 348 may cause a corresponding increase in the indicator of 5 for main user address in system environment 300c. For example, using the indicators and relationship score, the indicator for main user address 348 may be adjusted. The following calculation may be used; however, different calculations and operations may also be used. Associated accounts average: (9*9, 8*2, . . . , 2*1)=7; assuming weighted average of 20%, the resulting EMI or other indicator=original indicator of 5*80%+associated indicator of 7*20%=5*80%+7*20%=5.4. Thus, main user address 348 may be assigned a revised indicator of 5.4.

In system environment 300d, multiple metadata indicators may be used for an old or previous address and for a new address to be used with an account. Old user address 362 may be requested to be changed to new user address 364, such as an attacker's address during an ATO and attempted fraud. A request 372 may be transmitted to account provider 366, which in turn may perform a check 374 with email provider 368 for one or more EMIs or other metadata indicators. In some embodiments, email provider 368 may respond to account provider 366 with both metadata indicators. This may allow account provider 366 to assess and/or calculate a corresponding risk.

However, in system environment 300d, email provider 368 may respond with a composite indicator based on indicators for both old user address 362 and new user address 364. A compare 376 of the metadata indicators may be performed by email provider 368, where a calculation 378 of composite indicator 370 may be performed using one or more weights and/or calculations based on the metadata indicators for old user address 362 and new user address 364. Thereafter, email provider 368 may perform an indicator return 380 of composite indicator 370 to account provider 366, which may be used for risk assessment of the change from old user address 362 to new user address 364. A decision 382 may then be executed by account provider 366, which may include allowing the change, disallowing the change, holding the change for an amount of time, and/or requesting additional verification.

Figure 4:
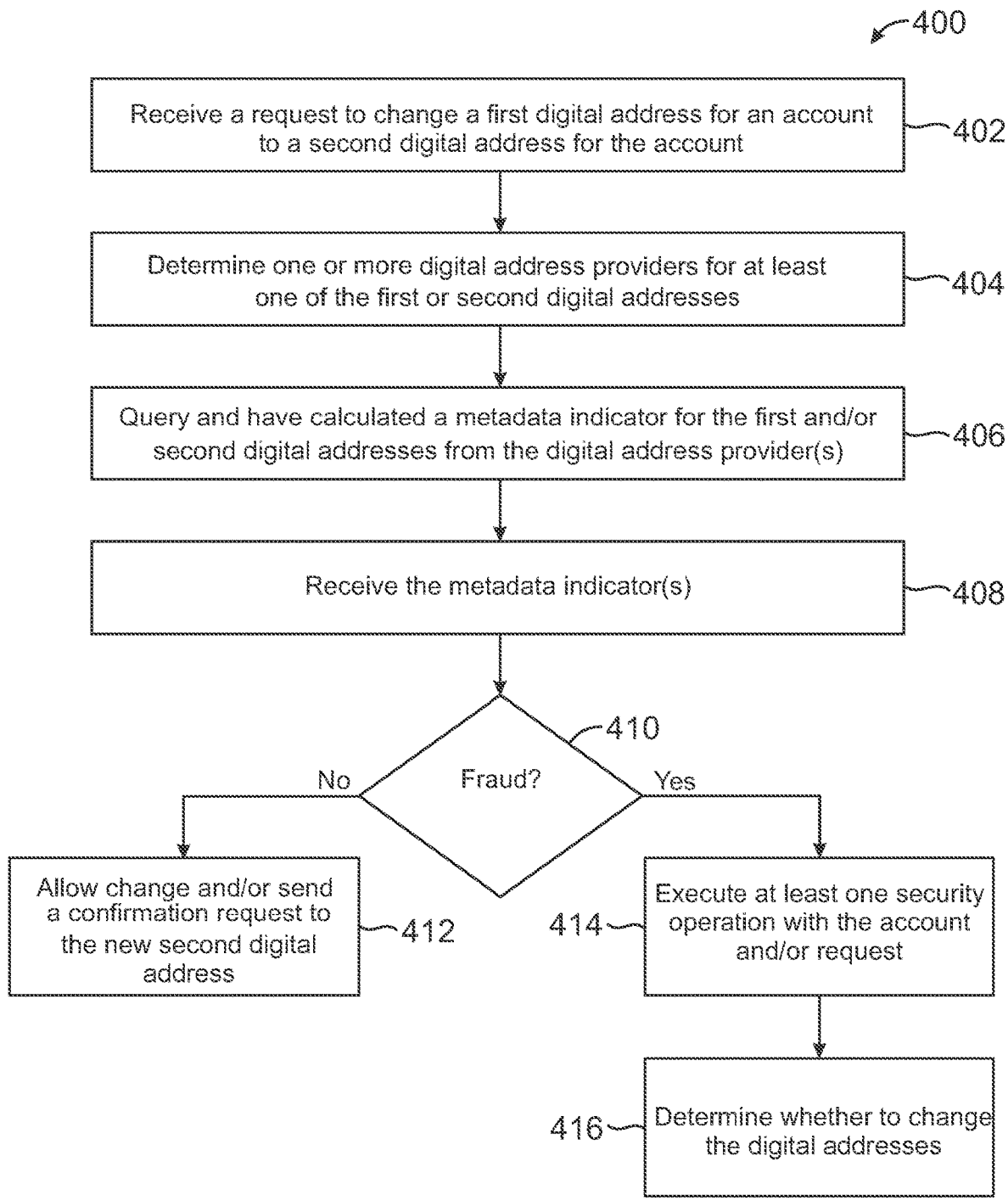
FIG. 4 is a flowchart for detecting malicious email addresses using email metadata indicators, according to an embodiment.

FIG. 4 is a flowchart 400 for detecting malicious email addresses using email metadata indicators, according to an embodiment. Note that one or more steps, processes, and methods described herein of flowchart 400 may be omitted, performed in a different sequence, or combined as desired or appropriate.

At step 402 of flowchart 400, a request to change a first digital address for an account to a second digital address for the account is received. This may be received in response to a user accessing an account and/or performing an account or password recovery process, which may request changing of account data. Thus, to prevent account security and data breach, as well as ATO, the service provider may utilize one or more API integrations with address providers, such as email or telecommunication service providers, that allow for querying of address health and likelihood of a compromised address and/or fraud. At step 404, one or more digital address providers for at least one of the first or second digital addresses are determined. The digital address provider for the new digital address to be used with the account may be identified, such as using a domain, a telecommunication provider of a phone number, or the like. Where telephone number data and/or metadata may be regulated by privacy laws and regulations for telecommunication carries, messaging applications (e.g., WHATSAPP®, TELEGRAM®, SIGNAL®, etc.) may be used to determine other metadata parameters for phone number usage, such as logins using the phone number to different accounts and/or in different locations.

At step 406, a metadata indicator is queried from, and requested to have calculated, for the first and/or second digital addresses from the digital address provider(s). The query may be performed through the API integration and may include an API call to the digital address provider(s) by the service provider associated with the account. In some embodiments, a calculation may be performed at the time of the query or may be performed at a certain time and stored for different accounts and addresses. The calculation may use different metadata parameters for each address, and may further be configured to hide any PII, identifying information, and/or sensitive information in the resulting score or output. In response to the query, at step 408, the metadata indicator(s) is/are received. This may correspond to an API request provided using the API integration based on API solutions provided by the service provider.

At step 410, it is determined whether the metadata indicator(s) indicate fraud or a compromised account. This may be done based on the score for the metadata indicator(s), as well as using a risk assessment and analysis engine, which may be rules-based and/or ML model-based. The determination may utilize a risk score matrix that standardizes risk scores across multiple digital address providers and may be provided as part of the API solution. If no fraud is determined, flowchart 400 proceeds to step 412, where the change is allowed and/or a confirmation request is sent to the new second digital address. Thus, the change may be allowed, and the account's data may be updated to reflect the second digital address for use with communications transmitted to a user or holder of the account.

However, if fraud is determined (which may also include a likelihood of fraud), flowchart 400 proceeds to step 414 where at least one security operation is executed with the account and/or request. The security operations may be based on different levels or likelihoods of fraud in the request to change addresses and/or whether the second digital address is compromised. For example, if the metadata indicator(s) are not healthy but are also not too risky (e.g., above one risk threshold but below another), secondary verification may be requested. However, if deemed too risky, a rejection of the change of digital addresses may occur. Further, one or more restrictions on the account may be implemented to prevent fraud that may occur during an ATO that also requests the address change. At step 416 after step 414, it is determined whether to change the digital addresses. Step 416 may occur in response to receiving secondary verification, which may be processed to determine if the request for address change is valid. If valid, the address change may go through and any restrictions on the account may be lifted. However, if not, or if the metadata indicator(s) indicate too high of a risk, the request for address change may be refused and one or more lockdowns or restrictions of the account may be implemented.

Figure 5:
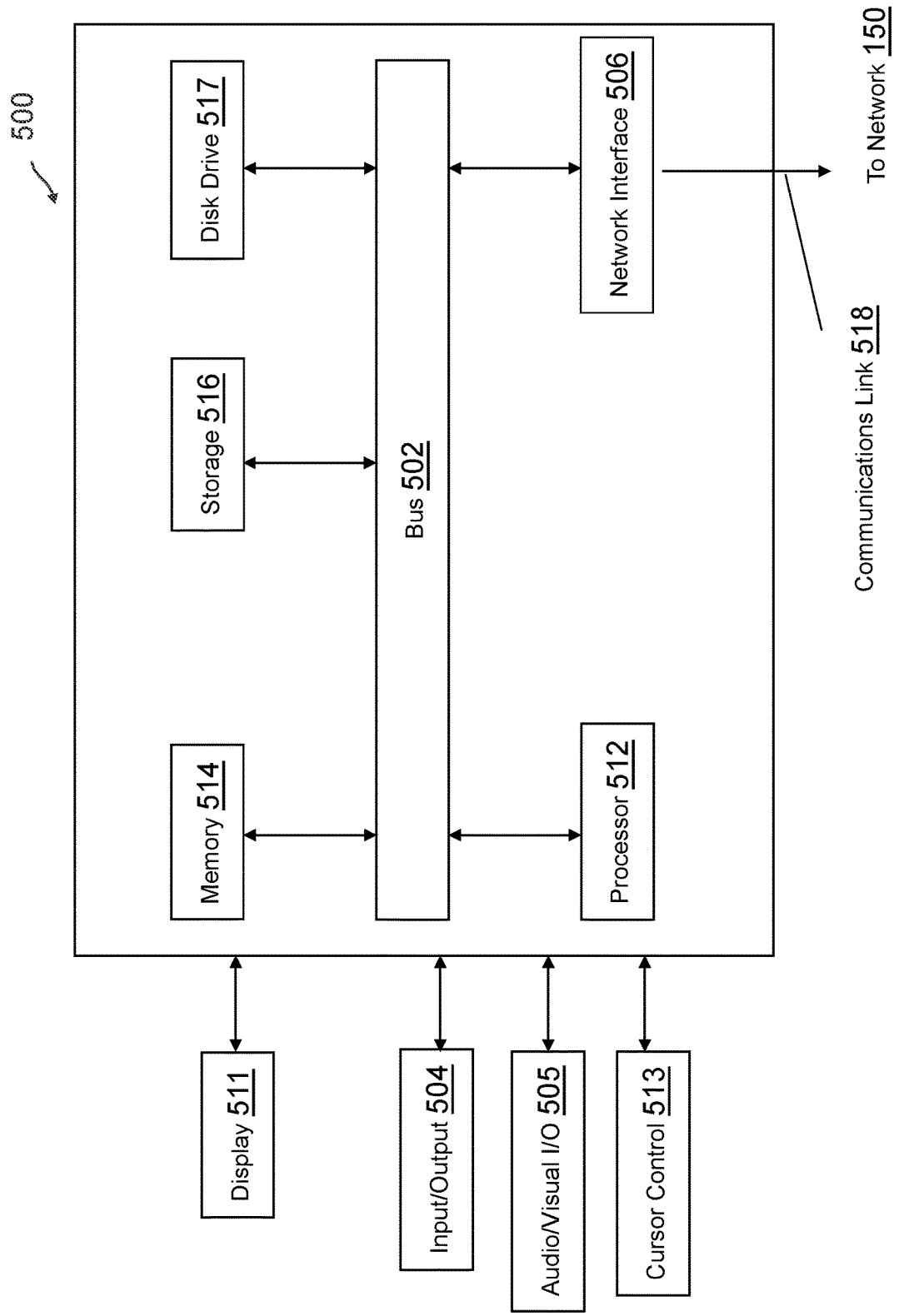
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing system comprising:
   a non-transitory memory; and
   one or more hardware processors coupled to the non-transitory memory and configured to read instructions from the non-transitory memory to cause the computing system to perform operations comprising:
      receiving, for an account with the computing system, a request to change a first digital address previously used for the account to a second digital address to be used with the account;
      determining a digital address provider for the second digital address;
      determining a plurality of metadata parameters for an address metadata indicator associated with the second digital address based on the request;
      retrieving the plurality of metadata parameters from the digital address provider for the address metadata indicator;
      generating the address metadata indicator from the digital address provider based on the plurality of metadata parameters;
      determining a risk analysis score of the request using a machine learning (ML) model and based on the address metadata indicator and an additional metadata parameter associated with the first digital address, wherein the risk analysis score is further determined using a risk matrix that standardizes a plurality of address metadata indicators received from a plurality of digital address providers; and
      executing at least one operation for the request to change the first digital address to the second digital address based on the risk analysis score and one or more fraud thresholds, wherein the one or more fraud thresholds are dynamically adjusted for the executing the at least one operation based on an account type, a transaction history, and a user behavior pattern associated with the account.

2. The computing system of claim 1, wherein the second digital address comprises an email address for an email account and the digital address provider comprises an email address provider, and wherein the at least one risk analysis score indicates whether the second digital address was generated by an entity for an attempted takeover of the account.

3. The computing system of claim 1, wherein the plurality of metadata parameters comprise at least one of an amount of time since a last login associated with the second digital address, an amount of time since a trusted last login associated with the second digital address, or a Boolean data type associated with one or more new connections by the second digital address with one or more other digital addresses.

4. The computing system of claim 1, wherein the plurality of metadata parameters are selected and processed to hide personally identifiable information associated with the second digital address in the address metadata indicator.

5. The computing system of claim 1, wherein prior to receiving the request, the operations further comprise:
   executing an integration between the computing system and the digital address provider for at least the account, wherein the integration enables sharing of address metadata indicators between the computing system and the digital address provider using application programming interface (API) calls exchangeable between the computing system and the digital address provider.

6. The computing system of claim 5, wherein prior to the executing, the operations further comprise:
   receiving an opt-in from a user associated with the account to enable the integration for sharing of the address metadata indicators.

7. The computing system of claim 1, wherein the retrieving is performed via at least one API call based on an API integration between the computing system and the digital address provider.

8. The computing system of claim 1, wherein the address metadata indicator comprises an output classifier of fraud associated with the second digital address by a risk analysis engine.

9. The computing system of claim 1, wherein prior to the executing the at least one operation for the request, the operations further comprise:
   determining that the address metadata indicator indicates potential fraud associated with the second digital address,
   and wherein the at least one operation comprises:
      preventing the request to change the first digital address to the second digital address until a confirmation of the second digital address to be used for the account is received, and
      notifying a user associated with the account of the request.

10. The computing system of claim 9, wherein the user associated with the account is notified at a third digital address different from the first digital address and the second digital address.

11. The computing system of claim 1, wherein the address metadata indicator hides personally identifiable information for the second digital address.

12. A method comprising:
receiving a request for a first email metadata indicator from a computing system, wherein the request is received responsive to changing a first email address used with an account of a user with the computing system to a second email address;
accessing a plurality of metadata attributes for the first email address or the second email address, wherein the plurality of metadata attributes are associated with at least one of a creation of the first email address or the second email address or a usage of the first email address or the second email address over a time period;
calculating the first email metadata indicator for the first email address or the second email address based on the plurality of metadata attributes, wherein the first email metadata indicator comprises a risk factor associated with whether the first email address or the second email address is created or controlled by a fraudulent user;
determining a risk analysis score of the request using a machine learning (ML) model and based on the first email metadata indicator and an additional metadata attribute associated with the second email address, wherein the risk analysis score is further determined using a risk matrix that standardizes a plurality of email metadata indicators associated with a plurality of email address providers; and
transmitting the first email metadata indicator to the computing system responsive to the request and based on one or more fraud thresholds for executing an operation, wherein the one or more fraud thresholds are dynamically adjusted for executing the operation based on an account type, a transaction history, and a user behavior pattern associated with the account.

13. The method of claim 12, wherein the plurality of metadata attributes comprise at least one of prior connections by the first email address or the second email address or a number of days since a last login or a last validated to the first email address or the second email address.

14. The method of claim 12, wherein the calculating and the first email metadata indicator hide personally identifiable information associated with the first email address or the second email address.

15. The method of claim 12, wherein the request is received for both of the first email address and the second email address, and wherein the method further comprises:
generating a second email metadata indicator for a second one of the first email address or the second email address,
wherein the second email metadata indicator is transmitted with the first email metadata indicator.

16. The method of claim 12, wherein the request is received by an account provider for only the first email address or the second email address, and wherein the first email metadata indicator is specific to the first email address or the second email address.

17. A non-transitory machine-readable medium having stored thereon machine-readable instructions executable to cause a machine to perform operations comprising:
detecting a change of a first contact identifier to a second contact identifier for an account with a service provider;
determining that the change requires a risk analysis of the second contact identifier, wherein the risk analysis identifies whether the second contact identifier is associated with a fraudulent account;
determining an account provider associated with the second contact identifier based on the second contact identifier;
determining a plurality of metadata parameters for an account metadata indicator associated with the second contact identifier based on the risk analysis of the second contact identifier;
requesting, from the account provider via an application programming interface (API) call, the plurality of metadata parameters for the second contact identifier, wherein the API call is performed via an API integration provided by the account provider with the service provider, and wherein the API integration provides secure communications between the account provider and the service provider that prevent sharing of personally identifiable information associated with the second contact identifier;
generating the account metadata indicator based on the plurality of metadata parameters received from the account provider via the API integration;
determining a risk analysis using a machine learning (ML) model and based on the account metadata indicator and an additional metadata parameter associated with first contact identifier, wherein the risk analysis score is further determined using a risk matrix that standardizes a plurality of account metadata indicators received from a plurality of account providers; and
determining a process to execute with the change of the first contact identifier to the second contact identifier based on the risk analysis of account metadata indicator and one or more fraud thresholds, wherein the one or more fraud thresholds are dynamically adjusted for the determining the process based on an account type, a transaction history, and a user behavior pattern associated with the account.

18. The non-transitory machine-readable medium of claim 17, wherein the process comprises a verification of the second contact identifier as a new contact identifier to be used with the account, and wherein the operations further comprise:
executing the process, wherein the executing comprises:
sending a first notification to the first contact identifier and a second notification to the second contact identifier, wherein the first notification alerts the first contact identifier of the change to the second contact identifier for the account, and wherein the second notification comprises a selectable interface element that completes the verification of the second contact identifier as the new contact identifier to be used with the account.

19. The non-transitory machine-readable medium of claim 17, wherein the account metadata indicator is below or at a threshold risk score for the risk analysis to complete the change, wherein the process comprises a restriction on the change to the second contact identifier as a new contact identifier to be used with the account, and wherein the operations further comprise:
executing the process, wherein the executing comprises:
transmitting a notification to the first contact identifier of the change to the second contact identifier; and preventing the change to the second contact identifier for the account.

20. The non-transitory machine-readable medium of claim 19, wherein the operations further comprise:
determining a third contact identifier for the account, wherein the third contact identifier is established with the account prior to the change to the second contact identifier; and
transmitting the notification to the third contact identifier.

\* \* \* \* \*